G. R. Baker,
Bread Machine,
No. 2,363. Reissued Sept. 25, 1866.
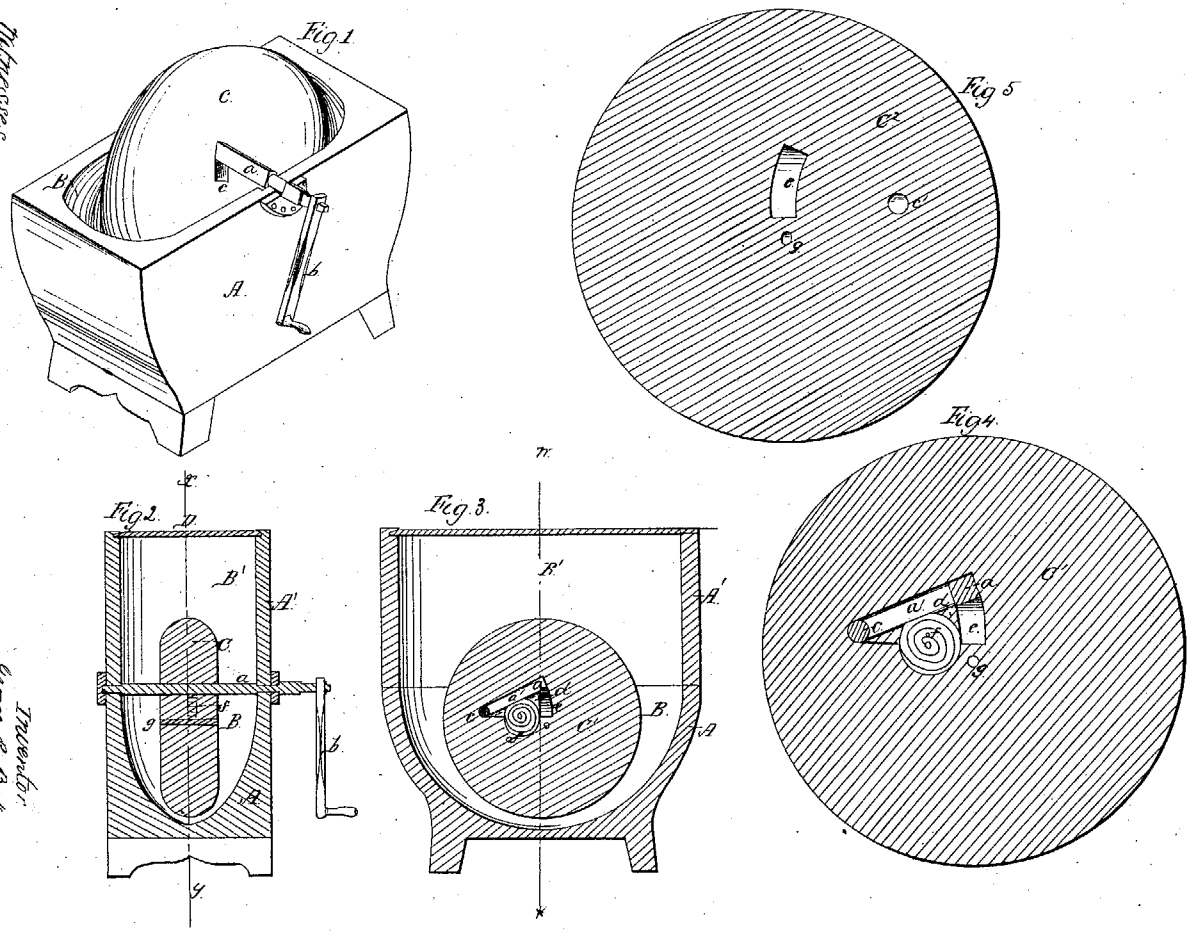
Witnesses:
John Coom
H. M. Flade
Inventor:
George R. Baker,
By J. J. Coombs
his Atty.
N. PETERS, PHOTO-LITHOGRAPHER, WASHINGTON, D. C.

UNITED STATES PATENT OFFICE.

GEORGE R. BAKER, OF ST. LOUIS, MISSOURI.

IMPROVED MACHINE FOR KNEADING DOUGH.

Specification forming part of Letters Patent No. 50,322, dated October 10, 1865; Reissue No. 2,363, dated September 25, 1866.

*To all whom it may concern:*

Be it known that I, GEORGE R. BAKER, of the city of St. Louis and State of Missouri, (late of Brooklyn, New York,) have invented a new and useful Machine for Kneading Dough; and I do hereby declare that the following is a full, clear, and exact description of the construction and operation of the same, reference being had to the annexed drawings, and to the letters of reference marked thereon.

The essential features of my invention consist in the inclosed chamber to contain the dough, in which a wheel is rotated upon an eccentric axis of rotation, by the action of which wheel upon the dough the latter is subjected to a rolling pressure, rapidly repeated, producing an effect upon it similar to that produced by hand kneading, but in much less time, and with much less labor.

My invention consists, secondarily, however, in so constructing said eccentric wheel, and the shaft upon which it rotates, that said eccentric wheel will have a yielding and variable axis of rotation, when it is desired so to construct the machine.

To enable others skilled in the art to make and use my invention, I will proceed to explain the principle of it, and the several modes in which I apply that principle and carry it into effect.

The essential principle of my invention consists in an eccentric wheel, rotating in a suitably-formed chamber containing the dough to be kneaded, by means of which the dough is subjected to a rolling pressure at every revolution of the wheel.

In the accompanying drawings, Figure 1 is an elevation of my machine in perspective, with the upper section of the box or chamber removed. Fig. 2 is a cross-section, drawn through the line *w x* of Fig. 3. Fig. 3 is a longitudinal vertical section through line *x y*, Fig. 2. Figs. 4 and 5 are the two parts or sections of the wheel, detached from each other, drawn on an enlarged scale.

Similar letters indicate the same parts of the machine in all the figures.

A is the lower section of the box or vessel containing the chamber for the dough, and A′ is the upper section of the same. B is the lower portion of the chamber or cavity for the dough, and B′ is the upper portion of the same. C is the eccentrically-rotating wheel; C′, the inner face of one section of said wheel, and $C^2$ the inner section of the other section.

The two sections of the box A and A′ are detachable from each other, and may be secured together by dowel-pins and hasps or any other suitable means. The interior of the lower part of the box or vessel is a concavity, B, semicircular in the plane of its greatest diameter, and semi-elliptical, or nearly so, in the plane of its greatest transverse diameter. The interior of the upper part, B′, is formed by merely extending the section shown in the lower by a vertical wall to the top of the box, where it is closed by a sliding cover, D. Within the concavity or chamber so formed the wheel C, of less diameter and thickness than the chamber, is rotated upon an eccentric axis, *a*, consisting of a shaft passing through the wheel outside of its center. I sometimes so construct this shaft, with its attachments, that the wheel in rotating will have a yielding and variable center of rotation, by means shown in the drawings, which I will now describe.

The shaft *a* has an arm, *a′*, projecting from it at right angles in the interior of the wheel C, which, at its outer end terminates in a cross-pivot, *c*, fitting into suitable holes in the two sections of the wheel, one of which is shown at *c′* in Fig. 5. Said arm *a′* has room to play back and forth in a V-shaped recess, *d*, cut in the inner face of the section C′ of the wheel, and the main shaft *a* has a corresponding play in the slot *e*, passing clear through both sections of the wheel.

A rubber spring, *f*, (but which may be of metal,) is fitted into a suitable recess in the inner face of the section C′ of the wheel, which will keep the shaft *a* and its projecting shaft *a′* in the position shown in the drawings, except when the dough, from its stiffness, offers considerable resistance to the rotation of the wheel; but when such resistance occurs the spring will yield, allowing the shaft to change its position in the slot *e*, varying the eccentricity of the axis of rotation and shortening the radius of motion of the wheel, and thus facilitating the passage of the dough under it.

The two sections of the wheel are fastened together by one or more rivets or bolts. as shown at *g*. When, however, the wheel is fixed rigidly on the shaft, there will be no necessity for making it in two sections, and it may be made of one solid piece of wood. In this case, however, the edge of the wheel should be beveled, so as to form an acute angle or blunt knife-edge at the periphery of its greatest circumference, so that it will cut its way through the dough when, from its stiffness, considerable resistance is offered to the rotation of the wheel.

A suitable quantity of dough is put into the kneading-chamber B B′, the two sections of the box firmly fastened together, and the chamber closed by the lid D. The operation of kneading is then performed by simply turning the crank *l*.

The box may be provided with suitable means for attaching it to a table, if desired.

What I claim as my invention, and desire to secure by Letters Patent, is—

1. The combination of the dough-kneading chamber B B′ and the eccentrically-rotating wheel C, whether said wheel rotates on a fixed and rigid or a flexible and yielding axis of rotation, as and for the purposes described.

2. The combination of the shaft *a*, with its pivoted arm *a′*, the slot *e*, and spring *f*, arranged and operating substantially as and for the purpose described.

GEO. R. BAKER.

Witnesses:
ALEX. H. COWEN,
I. S. HANSON.